No. 822,020. PATENTED MAY 29, 1906.
W. H. ROSE.
DISINFECTING APPARATUS.
APPLICATION FILED JULY 22, 1905.
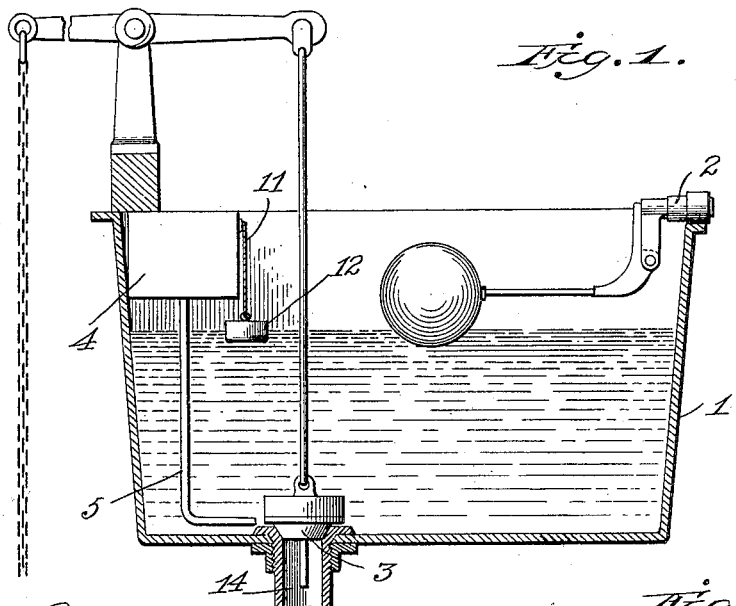
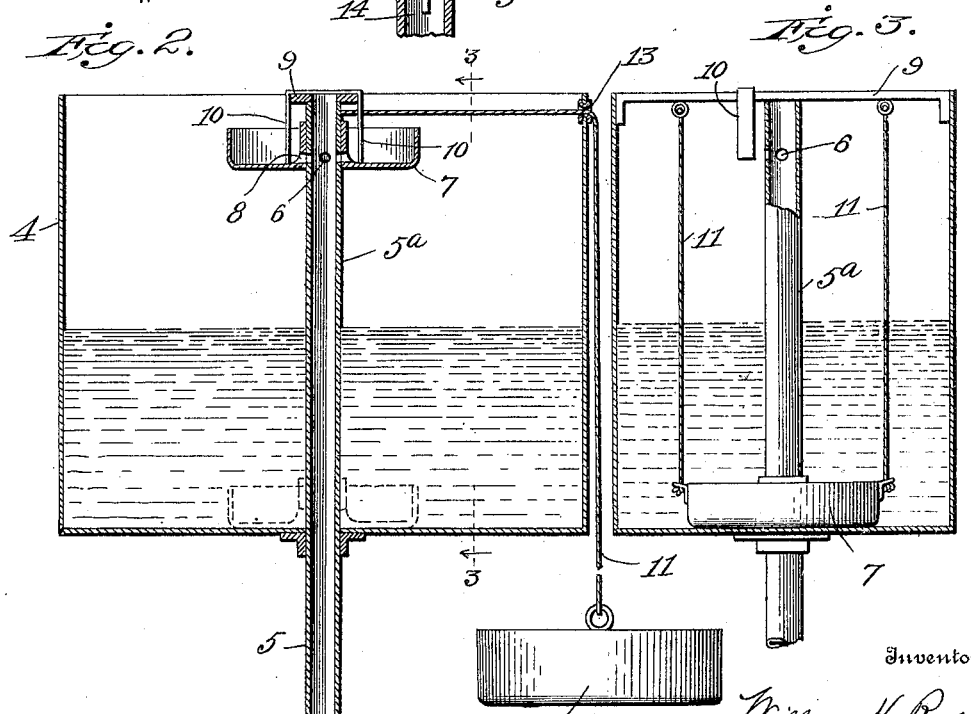
Witnesses
Edwin L. Jewell
Jno. J. McCarthy
Inventor
William H. Rose
By Foster Freeman & Watson
Attorneys

UNITED STATES PATENT OFFICE.

WILLIAM H. ROSE, OF BALTIMORE, MARYLAND.

DISINFECTING APPARATUS.

No. 822,020.

Specification of Letters Patent.

Patented May 29, 1906.

Application filed July 22, 1905. Serial No. 270,826.

*To all whom it may concern:*

Be it known that I, WILLIAM H. ROSE, a citizen of the United States, and a resident of Baltimore, Maryland, have invented certain new and useful Improvements in Disinfecting Apparatus, of which the following is a specification.

This invention comprises an attachment to a closet-tank for supplying a measured quantity of disinfectant to the tank each time the water is withdrawn therefrom.

The invention will be described in connection with the accompanying drawings, in which—

Figure 1 is a sectional view of a closet-tank provided with my invention. Fig. 2 is a sectional view of the disinfectant-measuring device, showing the parts in one position; and Fig. 3 is a sectional view taken on the line 3 3 of Fig. 2 and showing the measuring device in another position.

The object of my invention is to discharge a measured quantity of disinfectant into a closet-tank at each time the tank is operated and in such manner that it will effectively mingle with the water. Some varieties of disinfecting fluid do not mix with water or tend to float on top of the water, and it is difficult to cause such materials to properly mix with the water as or before it leaves the tank.

Referring to the drawings, 1 indicates a closet-tank having the usual float-controlled inlet-valve 2 and the usual outlet-valve 3. I provide a suitable receptacle 4 for disinfectant and locate the same at the upper part of the tank 1. The receptacle 4 is provided with a discharge-pipe 5, leading down and to the immediate vicinity of the valve 3, as illustrated in Fig. 1. The pipe 5 has a portion 5ª vertically arranged within the receptacle 4 and provided near its upper end with one or more perforations 6. Upon the vertical pipe or tube 5ª slides a pan 7, having openings 8, adapted to register with the openings 6 in the tube 5ª. Supported on a transverse bar or bridge 9 are one or more stops 10, adapted to intercept the upward movement of the pan 7 at the point where the openings 8 register with the holes 6 in the pipe 5ª.

I provide means controlled by the rise and fall of the water in the tank for raising and lowering the pan 7 between the position at the bottom of the receptacle (indicated by dotted lines in Fig. 2) and the position at the upper part thereof. (Indicated by full lines in Fig. 2.) As shown, the pan 7 is connected by two cords 11 with a float 12, and the pan rises as the float falls, and vice versa. As shown, the cords 11 pass out through openings 13 in the side of the receptacle 4.

The operation is as follows: When the main valve 3 is opened, the water in the tank 1 rushes out and the float 12 falls, raising the pan 7. The pan takes with it a portion of the disinfecting fluid in the receptacle 4, which is held until the pan reaches its uppermost position, when the fluid then runs down the pipe 5. The cords 11 may be of such length that the float 12 will not be permitted to follow the surface of the water until the valve 3 closes, in which case the disinfecting fluid will be discharged into the pipe 5, while the water is still rushing through the discharge-pipe 14 of tank 1. The suction created by the water rushing under the valve 3 will assist in drawing the disinfecting fluid from the pipe 5, and the charge of disinfecting fluid will pass down the pipe 14 with the water. If any disinfecting fluid be left in the pipe 5 after the valve 3 closes, it will be retained in said pipe by the water in tank 1 to be drawn out when the valve 3 is next opened.

Having described my invention, what I claim as new, and desire to secure by Letters Patent, is—

1. The combination with a closet-tank having a discharge-pipe and a valve therefor, of a receptacle for disinfecting fluid, a pipe leading from said receptacle and terminating within the closet-tank adjacent to the said valve, and means for transferring measured quantities of disinfecting fluid from said receptacle into said pipe during the outflow of water from the tank, said means being controlled by a float in the closet-tank, whereby the said measured quantities of disinfecting fluid are permitted to mix with the water in said tank as said water enters the discharge-pipe, for the purpose set forth.

2. The combination with a closet-tank, its discharge-pipe and valve therefor, of a receptacle for disinfecting fluid, a pipe extending downwardly from said receptacle, a pan adapted to slide on said pipe, means operated by the fall and rise of water in the tank for raising and lowering the said pan, and means for discharging the contents of the pan into said pipe.

3. The combination with a closet-tank, its discharge-pipe and valve therefor, of a receptacle for disinfecting fluid, a pipe leading from said receptacle to said discharge-valve and having a portion arranged vertically within the said receptacle, a pan sliding on said pipe within said receptacle, corresponding openings in said pan and pipe through which the contents of the pan may be discharged into the pipe, a stop for the pan to cause said openings to register, and means for automatically raising and lowering the pan.

4. The combination with a closet-tank, its discharge-pipe, and valve therefor, of a receptacle for disinfecting fluid having a discharge-pipe terminating at the said discharge-valve, said pipe having a vertically-arranged portion within the said receptacle, a pan sliding on said vertically-arranged portion, a float in said tank connected with said pan to raise and lower the latter, and discharge-openings in the pan adapted to register with similar openings in the upper part of the disinfecting-discharge pipe, substantially as described.

In testimony whereof I have signed my name to this specification in the presence of two subscribing witnesses.

WILLIAM H. ROSE.

Witnesses:
BERNARD A. SCHMITZ,
PHILIP ROLLE.